United States Patent
Nakai et al.

(10) Patent No.: US 9,731,980 B2
(45) Date of Patent: Aug. 15, 2017

(54) PROCESSING DEVICE AND PROCESSING METHOD FOR HYDROGEN-SULPHIDE-CONTAINING BARREN SOLUTION

(71) Applicant: SUMITOMO METAL MINING CO., LTD., Tokyo (JP)

(72) Inventors: Takayuki Nakai, Tokyo (JP); Satoshi Matsubara, Tokyo (JP); Osamu Nakai, Tokyo (JP); Yoji Kyoda, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 252 days.

(21) Appl. No.: 14/651,396

(22) PCT Filed: Nov. 22, 2013

(86) PCT No.: PCT/JP2013/081471
§ 371 (c)(1),
(2) Date: Jun. 11, 2015

(87) PCT Pub. No.: WO2014/091903
PCT Pub. Date: Jun. 19, 2014

(65) Prior Publication Data
US 2015/0329379 A1    Nov. 19, 2015

(30) Foreign Application Priority Data
Dec. 11, 2012 (JP) .................. 2012-270721

(51) Int. Cl.
*B01F 3/04* (2006.01)
*B01D 19/00* (2006.01)
(Continued)

(52) U.S. Cl.
CPC ............ *C02F 1/20* (2013.01); *B01D 19/0005* (2013.01); *B01F 3/0412* (2013.01);
(Continued)

(58) Field of Classification Search
CPC ...... B01F 3/04; B01F 3/04106; B01F 3/0412; B01F 3/04241; B01D 19/00; B01D 19/0005
(Continued)

(56) References Cited

U.S. PATENT DOCUMENTS 4,519,959 A    5/1985    Takeuchi et al.
4,779,990 A    10/1988    Hjort et al.
(Continued)

FOREIGN PATENT DOCUMENTS

GB    2311517 A    10/1997
JP    S58-186425 A    10/1983
(Continued)

OTHER PUBLICATIONS

Jul. 14, 2016 Search Report issued in European Patent Application No. 13861760.0.
(Continued)

*Primary Examiner* — Robert A Hopkins
(74) *Attorney, Agent, or Firm* — Oliff PLC (57) ABSTRACT

Provided are a treatment method for a barren solution, and a treatment device for a barren solution, with which hydrogen sulfide can be efficiently removed from the barren solution. In an aeration tank provided with a vertical-type cylindrical reaction vessel, stirring blades arranged in the reaction vessel, and an annular aeration tube having a large number of air outlets, which is arranged to a bottom part of the reaction vessel, aeration is performed by blowing gas for aeration into the reaction vessel from a large number of air outlets of the aeration tube while stirring a liquid by rotation of the stirring blades.

9 Claims, 4 Drawing Sheets

(51) Int. Cl.
*C02F 1/20* (2006.01)
*C02F 1/74* (2006.01)
*B01F 7/16* (2006.01)
*B01F 7/22* (2006.01)
*C22B 3/00* (2006.01)
*C02F 101/10* (2006.01)
*C02F 103/02* (2006.01)
*C02F 103/10* (2006.01)
*C02F 103/16* (2006.01)

(52) U.S. Cl.
CPC ...... *B01F 3/04241* (2013.01); *B01F 3/04248* (2013.01); *B01F 7/1675* (2013.01); *B01F 7/22* (2013.01); *C02F 1/74* (2013.01); *C22B 23/043* (2013.01); *C22B 23/0461* (2013.01); *B01F 2003/04326* (2013.01); *C02F 2101/101* (2013.01); *C02F 2103/02* (2013.01); *C02F 2103/10* (2013.01); *C02F 2103/16* (2013.01); *C02F 2303/04* (2013.01)

(58) Field of Classification Search
USPC ................ 261/84, 119.1, 121.1, 123; 95/263
See application file for complete search history.

(56) References Cited

U.S. PATENT DOCUMENTS

| | | | | |
|---|---|---|---|---|
| 5,939,313 | A | * | 8/1999 | Cheng ............... B01F 3/04531 261/121.1 |
| 6,368,381 | B1 | * | 4/2002 | King .................. B01F 3/04539 75/710 |
| 2005/0265910 | A1 | | 12/2005 | Kobayashi et al. |
| 2010/0018350 | A1 | | 1/2010 | Shibayama et al. |
| 2011/0163042 | A1 | | 7/2011 | Kobayashi et al. |
| 2013/0001173 | A1 | | 1/2013 | Kobayashi et al. |

FOREIGN PATENT DOCUMENTS

| | | |
|---|---|---|
| JP | S62-125834 A | 6/1987 |
| JP | H03-249930 A | 11/1991 |
| JP | H04-89541 U1 | 8/1992 |
| JP | H08-71585 A | 3/1996 |
| JP | H09-248576 A | 9/1997 |
| JP | H09-314169 A | 12/1997 |
| JP | H09-314170 A | 12/1997 |
| JP | H10-258222 A | 9/1998 |
| JP | 2001-239139 A | 9/2001 |
| JP | 3225836 B2 | 11/2001 |
| JP | 2002-282664 A | 10/2002 |
| JP | 2005-350766 A | 12/2005 |
| JP | 2010-031302 A | 2/2010 |
| JP | 2010-095788 A | 4/2010 |
| JP | 2010-207674 A | 9/2010 |
| JP | 2011-206757 A | 10/2011 |
| JP | 2011-225908 A | 11/2011 |
| JP | 2012-240012 A | 12/2012 |
| WO | 01/18263 A1 | 3/2001 |
| WO | 2011/132693 A1 | 10/2011 |

OTHER PUBLICATIONS

Feb. 10, 2014 International Search Report issued in International Patent Application No. PCT/JP2013/081471.

Oct. 16, 2014 International Preliminary Report on Patentability issued in International Patent Application No. PCT/JP2013/081471.

* cited by examiner

PROCESSING DEVICE AND PROCESSING METHOD FOR HYDROGEN-SULPHIDE-CONTAINING BARREN SOLUTION

TECHNICAL FIELD

The present invention relates to a treatment method and a treatment device for a barren solution containing hydrogen sulfide, such as a process liquid after a sulfurization treatment of a nickel oxide ore plant. The present application claims a priority based on Japanese Patent Application No. 2012-270721 filed on Dec. 11, 2012 in Japan, and the Application is incorporated into the present application by reference.

BACKGROUND ART

Conventionally, as a hydrometallurgy method for recovering a valuable metal such as nickel and cobalt from a nickel oxide ore having a low nickel content represented by a limonite ore and the like, a high temperature pressure acid leaching (HPAL: High Pressure Acid Leaching) method using sulfuric acid has been known.

Figure 4:
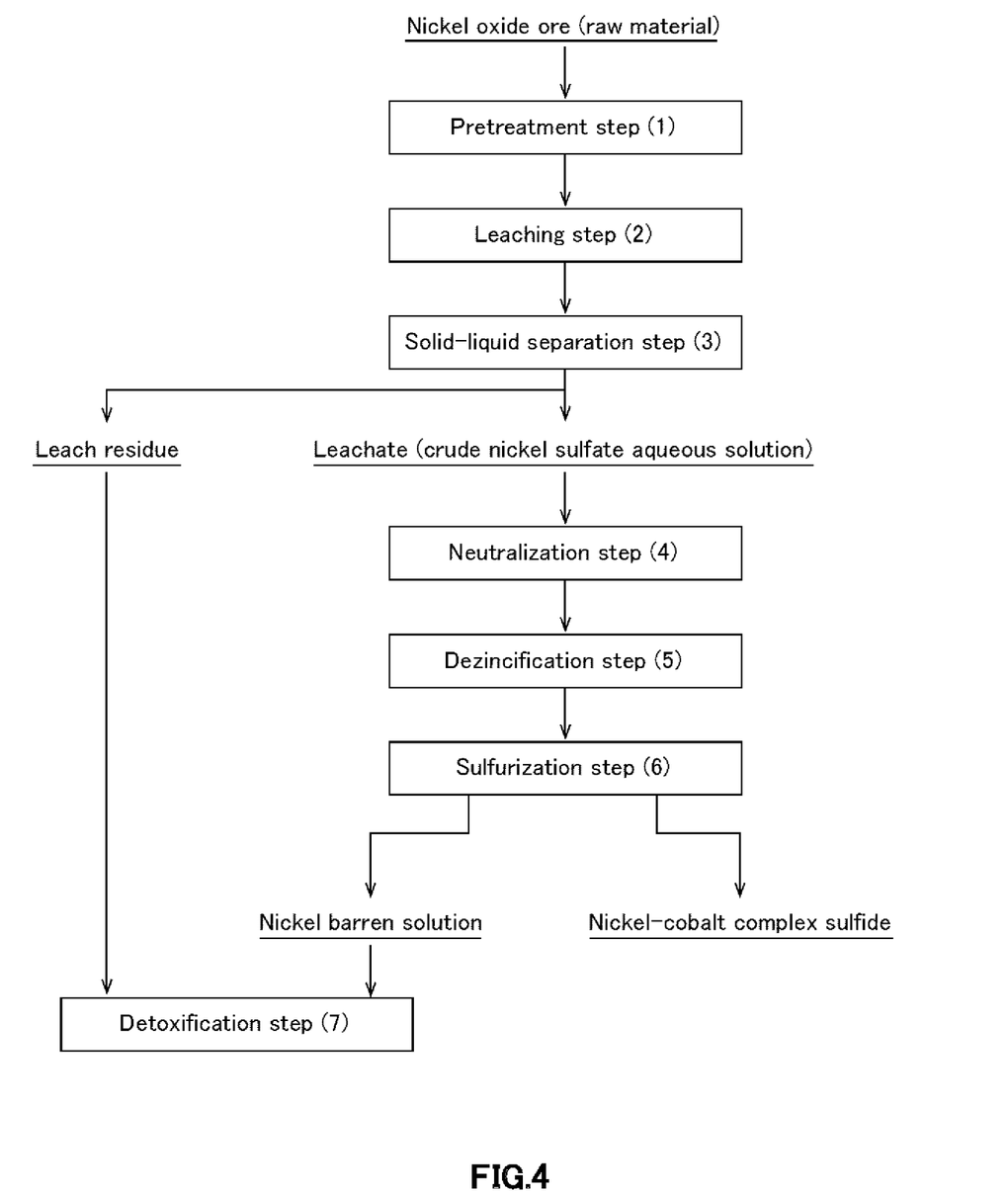
FIG. 4 is a process chart of a nickel oxide ore plant by a high pressure acid leach method.

For example, in a high pressure acid leach method to obtain a nickel-cobalt mixed sulfide, as shown in FIG. 4, a pretreatment step (1), a leaching step (2), a solid-liquid separation step (3), a neutralization step (4), a dezincification step (5), a sulfurization step (6), and a detoxification step (7) are included (for example, see Patent Document 1).

In a pretreatment step (1), a nickel oxide ore is ground and classified to obtain a slurry.

In a leaching step (2), sulfuric acid is added into the slurry obtained in the pretreatment step (1), the resultant mixture is stirred at a temperature of 220 to 280° C., and high temperature pressure acid leaching is performed to obtain a leach slurry.

In a solid-liquid separation step (3), a leach slurry obtained in the leaching step (2) is subjected to solid-liquid separation to obtain a leachate containing nickel and cobalt (hereinafter, referred to as "crude nickel sulfate aqueous solution"), and leach residues.

In a neutralization step (4), a crude nickel sulfate aqueous solution obtained in the solid-liquid separation step (3) is neutralized.

In a dezincification step (5), hydrogen sulfide gas is added into the crude nickel sulfate aqueous solution neutralized in the neutralization step (4), and zinc is precipitated and removed as a zinc sulfide.

In a sulfurization step (6), hydrogen sulfide gas is added into the dezincification final solution obtained in the dezincification step (5), and a nickel-cobalt complex sulfide and a nickel barren solution are obtained. In a detoxification step (7), a heavy metal is solidified and removed as a hydroxide by a final neutralization treatment, and a leach residue generated in the solid-liquid separation step (3) and a nickel barren solution generated in the sulfurization step (6) are detoxified.

In general, many kinds of heavy metals are contained in a nickel oxide ore, the nickel oxide ore is dissolved by using sulfuric acid under high temperature high pressure conditions, and then a chemical treatment is performed to remove impurities, subsequently, a required metal such as nickel is recovered in a sulfurization step. In a sulfurization reaction, hydrogen sulfide gas, and a salt such as sodium hydrogen sulfide, and sodium sulfide are used, however, an unreacted sulfide remains after the sulfurization step.

In a case where hydrogen sulfide gas is used in a sulfurization reaction, unreacted hydrogen sulfide gas is dissolved in a solution after the reaction, and also in a case where a salt such as sodium hydrogen sulfide, and sodium sulfide are used, hydrogen sulfide gas may be generated depending on the state of the solution. The solution after sulfurization is reused or subjected to a wastewater treatment in a step (for example, see Patent Document 2).

When hydrogen sulfide gas is generated in these steps, it is not desired from the viewpoint of the working hygiene and the environment.

Conventionally, as a removal method of dissolved hydrogen sulfide in a solution (barren solution) after sulfurization reaction, a method in which a nickel oxide ore slurry after leaching is added into a barren solution after sulfurization, a reduction action with trivalent iron existed in a large amount in the nickel oxide ore slurry after leaching is utilized, and hydrogen sulfide is oxidized to sulfur to decrease the concentration of the dissolved hydrogen sulfide has been known.

However, in a case where a method described above is used, the addition of acid and the slurry after leaching are repeatedly required, and further, dissolved hydrogen sulfide still exists in a solution after reaction, therefore, further decrease of the dissolved hydrogen sulfide is required.

PRIOR ART DOCUMENT

Patent Document

Patent Document 1: Japanese Patent Application Laid-Open (JP-A) No. 2011-225908
Patent Document 2: JP-A No. 2005-350766
Patent Document 3: JP-A No. H08-071585
Patent Document 4: JP-A No. H10-258222

SUMMARY OF THE INVENTION

Problems to be Solved by the Invention

The present invention has been made in consideration of these circumstances, and an object of the present invention is to provide a treatment method and a treatment device for a barren solution, with which the dissolved hydrogen sulfide gas can effectively be decreased for example, in a solution containing hydrogen sulfide gas such as a process liquid after a sulfurization treatment in a hydrometallurgy treatment for a nickel oxide ore.

Another object of the present invention, and a specific advantage obtained by the present invention become more apparent from the explanation of an embodiment described below.

Means to Solve the Problems

In the present invention, an annular aeration tube having a large number of air outlets is arranged to a bottom part of a vertical-type cylindrical reaction vessel, aeration is performed by using a simple aeration device for blowing gas for aeration from a large number of air outlets of the annular aeration tube, while stirring a barren solution containing hydrogen sulfide in the reaction vessel, and the hydrogen sulfide is removed from the barren solution.

That is, the present invention characterized by a treatment method for a barren solution containing hydrogen sulfide, in which in an aeration tank provided with a vertical-type cylindrical reaction vessel, stirring blades is arranged in the reaction vessel, and an annular aeration tube has a large number of air outlets and is arranged to the bottom part of the reaction vessel, aeration is performed by introducing gas for aeration into the reaction vessel from a large number of air outlets of the aeration tube, while stirring a barren solution containing hydrogen sulfide by rotation of the stirring blades, and the hydrogen sulfide is removed from the barren solution.

Further, the present invention characterized by a treatment device for a barren solution containing hydrogen sulfide, in which the treatment device includes an aeration tank provided with a vertical-type cylindrical reaction vessel, stirring blades arranged in the reaction vessel, and an annular aeration tube having a large number of air outlets and being arranged to the bottom part of reaction vessel, and in the aeration tank, aeration is performed by introducing gas for aeration into the reaction vessel from a large number of air outlets of the aeration tube, while stirring a barren solution containing hydrogen sulfide by rotation of the stirring blades, and the hydrogen sulfide is removed from the barren solution.

In the present invention, the above-described barren solution can be a process liquid after a sulfurization treatment in a hydrometallurgy plant for a nickel oxide ore.

Further, in the present invention, aeration can be performed by the aeration tube formed in an annular shape having a diameter size of 70 to 90% of that of the reaction vessel.

In addition, in the present invention, aeration can be performed from the air outlets formed in a circular shape having a diameter of 10 to 20 mm.

Further, in the present invention, aeration with 10 to 20 short tube pipes that are arranged at equal intervals in the aeration tube as the air outlets can be performed.

In addition, in the present invention, the gas for aeration can be air.

Further, in the present invention, by performing aeration in the aeration tank, the hydrogen sulfide gas generated in a step of reusing a solution after sulfurization, or in a wastewater treatment step can be decreased.

Advantageous Effects of the Invention

According to the present invention, an annular aeration tube having a large number of air outlets is arranged to the bottom part in a vertical-type cylindrical reaction vessel, aeration is effectively performed by using a simple aeration device for blowing gas for aeration from a large number of air outlets of the annular aeration tube, while stirring a barren solution containing hydrogen sulfide in the reaction vessel, and hydrogen sulfide can be efficiently aerated and removed from a barren solution.

Further, in the present invention, in particular, a reaction tank with stirring blades, in which a slurry after leaching is added into a barren solution obtained from a sulfurization step in a wet treatment plant for a nickel oxide ore, can be suitably used as an aeration tank, and the hydrogen sulfide gas generated in a step of reusing a solution after sulfurization, or in the subsequent wastewater treatment step can be effectively decreased.

DESCRIPTION OF THE EMBODIMENTS

Hereinafter, a specific embodiment to which the present invention is applied will be described in detail with reference to the drawings.

Figure 1:
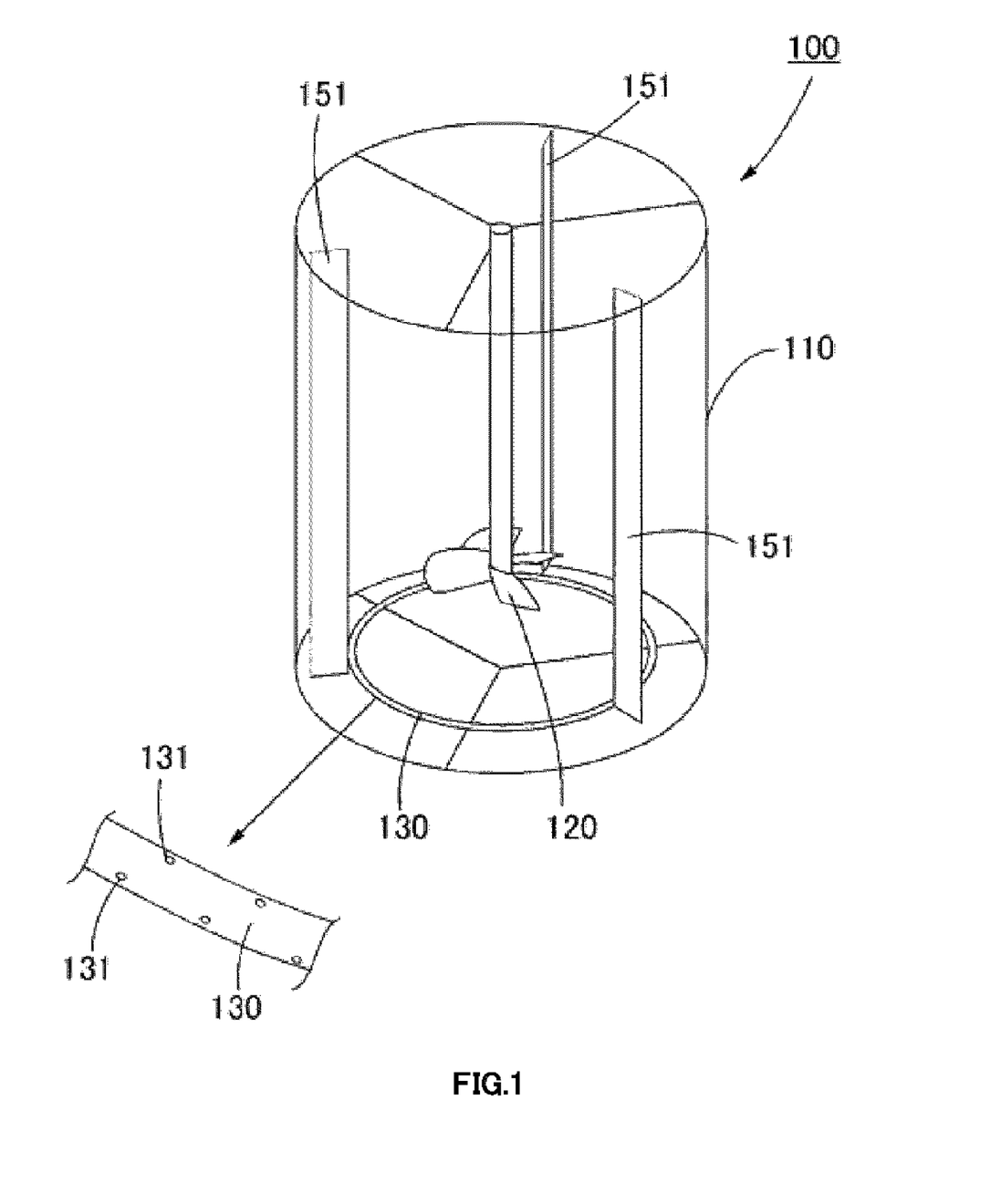
FIG. 1 is a perspective view illustrating essential constitution of a constitution example of a barren solution treatment device to which the present invention is applied, by seeing through the constitution.

A treatment method for a barren solution according to the present embodiment is, for example, performed by a barren solution treatment device 100 with the constitution as illustrated in FIG. 1.

The barren solution treatment device 100 is an aeration tank provided with a vertical-type cylindrical reaction vessel 110, stirring blades 120 arranged in the reaction vessel 110, and an annular aeration tube 130 having a large number of air outlets 131 and being arranged to bottom part of the reaction vessel 110. Further, in the vertical-type cylindrical reaction vessel 110, three plates of baffle plates 151 are arranged.

In a treatment method for a barren solution according to the present embodiment, in a vertical-type cylindrical reaction vessel 110, aeration is performed by introducing gas for aeration into the reaction vessel 110 from a large number of air outlets 131 of the aeration tube 130, while stirring a barren solution containing hydrogen sulfide by rotation of stirring blades 120, and the hydrogen sulfide is removed from the barren solution.

For example, in a hydrometallurgy plant for a nickel oxide ore, in a detoxification step as described above, a heavy metal is solidified and removed as a hydroxide by a final neutralization treatment, and a leach residue generated in a solid-liquid separation step and a nickel barren solution generated in a sulfurization step are detoxified and discarded. In this case, in the present embodiment, for example, as shown in a process chart of FIG. 2, a hydrogen sulfide removal step is arranged as a preceding step of a detoxification step, and in the hydrogen sulfide removal step, hydrogen sulfide is removed from a barren solution obtained as a process liquid (solution after sulfurization) after a sulfurization treatment by using the above-described barren solution treatment device 100.

That is, in a reaction tank for removing hydrogen sulfide from a barren solution containing hydrogen sulfide, which is obtained as a process liquid after a sulfurization treatment in a preceding step of a detoxification step, an annular aeration tube 130 having a large number of air outlets 131 is arranged, and the reaction tank is used as the above-described barren solution treatment device 100.

Specifically, in the barren solution treatment device 100 that is the reaction tank, a barren solution containing hydrogen sulfide, which is obtained as a process liquid after a sulfurization treatment, is charged into the vertical-type cylindrical reaction vessel 110, and in the reaction vessel 110, the barren solution containing hydrogen sulfide is stirred by rotation of stirring blades 120. Further, in the reaction vessel 100, for the barren solution, aeration is performed by introducing air as gas for aeration from a large number of air outlets 131 of the annular aeration tube 130, and the sulfur content of the remaining hydrogen sulfide in the barren solution is reduced to sulfur, as a result, the hydrogen sulfide is removed from the barren solution.

In addition, in a hydrometallurgy plant for a nickel oxide ore, into a barren solution containing hydrogen sulfide, which is obtained as a process liquid after a sulfurization treatment, a slurry after leaching, which is obtained in a leaching step, is partly added. Therefore, in the hydrogen sulfide removal step, by the reducing power of $Fe^{3+}$ contained in the added slurry, the sulfur content of part of the remaining hydrogen sulfide in the barren solution is reduced to sulfur, therefore, hydrogen sulfide can more efficiently be removed from the barren solution.

That is, The barren solution treatment device 100 used for performing a treatment method for a barren solution according to the present embodiment includes an aeration tank provided with a vertical-type cylindrical reaction vessel 110, stirring blades 120 arranged in the reaction vessel 110, and an annular aeration tube 130 having a large number of air outlets 131 and being arranged to the bottom part of the reaction vessel 110, and in the aeration tank, aeration is performed by introducing gas for aeration into the reaction vessel 110 from a large number of air outlets 131 of the aeration tube 130, while stirring a barren solution containing hydrogen sulfide by rotation of stirring blades 120, and the hydrogen sulfide is removed from the barren solution.

As described above, in the barren solution treatment device 100, not only a barren solution containing hydrogen sulfide is stirred by rotation of stirring blades 120 in the reaction vessel, that is, in the aeration tank, but also gas for aeration is blown into the reaction vessel. As a result, the remaining hydrogen sulfide is discharged from the stirred barren solution by aeration, and the residual concentration of the hydrogen sulfide is decreased.

Moreover, in the barren solution treatment device 100, aeration is performed via an annular aeration tube 130 having a large number of air outlets 131 and being arranged to bottom part of the reaction vessel 110, so that bubbles to flow into the reaction vessel 110 are allowed to be split into small bubbles, and the total area of bubbles is tried to be increased. As a result, an abundance of bubbles can be brought into contact with the barren solution containing hydrogen sulfide, which is uniformly stirred in the reaction vessel 110, and a high aeration effect can be obtained. That is, the gas for aeration fed into the reaction vessel 110 becomes in the state of being dispersed on the bottom of the aeration tank from immediately after the feeding, therefore, the aeration can be efficiently performed over the entire barren solution.

In general, the set time of the reaction in a stirring reaction device is usually shorter than the sufficient aeration time by an ordinary aerator. However, according to the barren solution treatment device 100, the retention time in the reaction vessel 100 becomes a prerequisite by the providing of an aeration function in the reaction vessel 110, therefore, even if the sufficient aeration time is not necessarily ensured, the aeration can efficiently be performed as described above, and the hydrogen sulfide can effectively be decreased.

Figure 2:
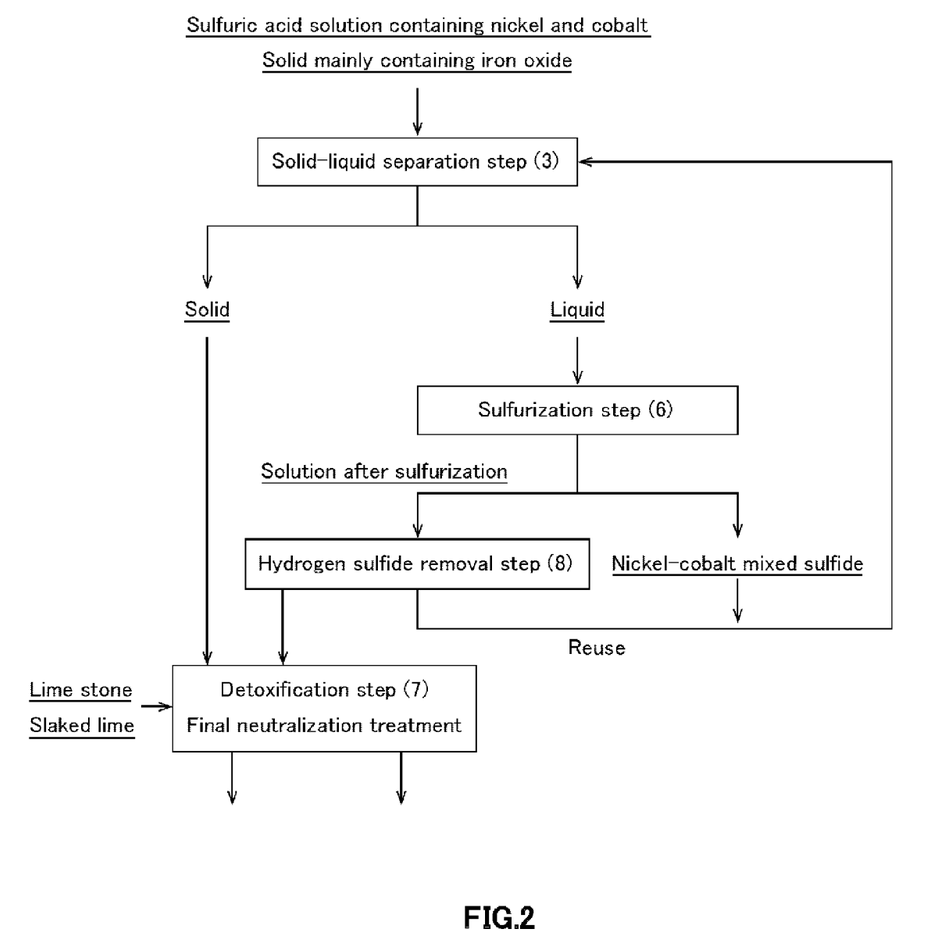
FIG. 2 is a process chart of a hydrometallurgy plant for a nickel oxide ore, in which a barren solution treatment device is used.

As shown in the process chart of FIG. 2, the barren solution from which hydrogen sulfide has been removed by a barren solution treatment device 100 is returned to the solid-liquid separation step, and can be reused as washing water.

As described above, a hydrogen sulfide removal step is arranged as a preceding step of a detoxification step, and in the hydrogen sulfide removal step, the remaining hydrogen sulfide can effectively be removed by the aeration using the above-described barren solution treatment device 100, therefore, the generation of the hydrogen sulfide gas in a step in which a solution after sulfurization is reused, or in a waste-water treatment step can be suppressed.

The gas for aeration is not particularly limited as long as the gas for aeration is maintained the bubbles in a liquid, that is, not being easily dissolved into a liquid, however, air is preferably used in view of cost.

Further, the shape of the aeration tube is not particularly limited, however, is preferably formed in an annular shape having a diameter size of 70 to 90% of that of the reaction solution 120.

Herein, as to the shape of aeration tube 130, results of the observation of the relationship between the diameter of the aeration tube 130 and the aeration effect, when the diameter of the aeration tube 130 is changed based on the diameter of the reaction vessel 110, are shown in Table 1.

TABLE 1

| | Diameter of circular pipe (proportion of diameter to the tank diameter) (%) | | | | |
|---|---|---|---|---|---|
| | 50 | 60 | 70 | 80 | 90 |
| Aeration effect | Δ | Δ | ○ | ○ | ○ |

As is apparent from the observation results shown in Table 1, it has been found that a high aeration effect can be obtained by the forming of the aeration tube 130 in the barren solution treatment device 100 in an annular shape having a diameter size of 70 to 90% of that of the reaction vessel 110.

In order to stabilize the flow in the reaction vessel 110 of the barren solution treatment device 100, the air is required to be gone up along the vessel wall. In this respect, the air can efficiently be gone up along the vessel wall by the forming of the aeration tube 130 in the barren solution treatment device 100 in an annular shape having a diameter size of 70 to 90% of that of the reaction vessel 110.

Further, the air outlet 131 formed to the aeration tube is not particularly limited, however, is preferably formed in a circular shape having a diameter of 10 to 20 mm.

Herein, as to the air outlets 131 formed to an aeration tube, results of the observation of the relationship between the bore diameter of the air outlets 131 and the aeration effect, when the bore diameter of the air outlets 131 is changed by the setting of the bore shape as circular, are shown in Table 2.

TABLE 2

| | Blowing bore diameter (mm) | | | | |
|---|---|---|---|---|---|
| | 5 | 10 | 15 | 20 | 25 |
| Aeration effect | Δ | ○ | ○ | ○ | Δ |

As is apparent from the observation results shown in Table 2, it has been found that a high aeration effect can be obtained by the forming of the air outlets 131 of the aeration tube 130 in the barren solution treatment device 100 in a circular shape having a diameter of 10 to 20 mm.

It is presumed that there is an optimal bubble size for the density and flow characteristics of the barren solution, and it is considered that if the bubble size is smaller than 10 mm, the rising speed of bubbles in a barren solution is extremely slow, on the other hand, if the bubble size is larger than 20 mm, the rising speed is extremely fast.

Further, the number of the air outlets 131 is not particularly limited, and is preferably appropriately determined depending on the length of the circumference of the aeration tube, however, for example, the number of the air outlets 131 is preferably around 10 outlets, and more preferably 20 outlets.

Herein, as to the number of air outlets 131, results of the observation of the relationship between the number of the air outlets 131 and the aeration effect, when the number of the air outlets 131 is changed, are shown in Table 3.

TABLE 3

|  | The number of blowing bores | | | |
| --- | --- | --- | --- | --- |
|  | 3 | 5 | 10 | 20 |
| Aeration effect | Δ | Δ | ○ | ◎ |

As is apparent from the observation results shown in Table 3, it has been found that a high aeration effect can be obtained by the setting of the number of the air outlets 131 of the aeration tube 130 in the barren solution treatment device 100 as 10 outlets, and a much higher aeration effect can be obtained by the forming of 20 outlets.

In the aeration tube 130, when the number of air outlets is increased, the upflow of air becomes weak, and the retention time of the air in an aeration tank is increased, therefore, the aeration efficiency is increased. When the number of air outlets 131 is less than 10, the aeration effect is insufficient, and when the number of air outlets 131 is increased in series, the effect is increased, however, when the number is more than 20, the aeration effect is hardly improved any more.

In addition, the air outlets 131 are not mere pores, when a short pipe (outlet) is attached in the arranged pore, the gas flow is rectified, and the bubble size is stabilized, therefore, this is preferred. Further, the number of the outlets is preferably around 10 to 20.

Figure 3:
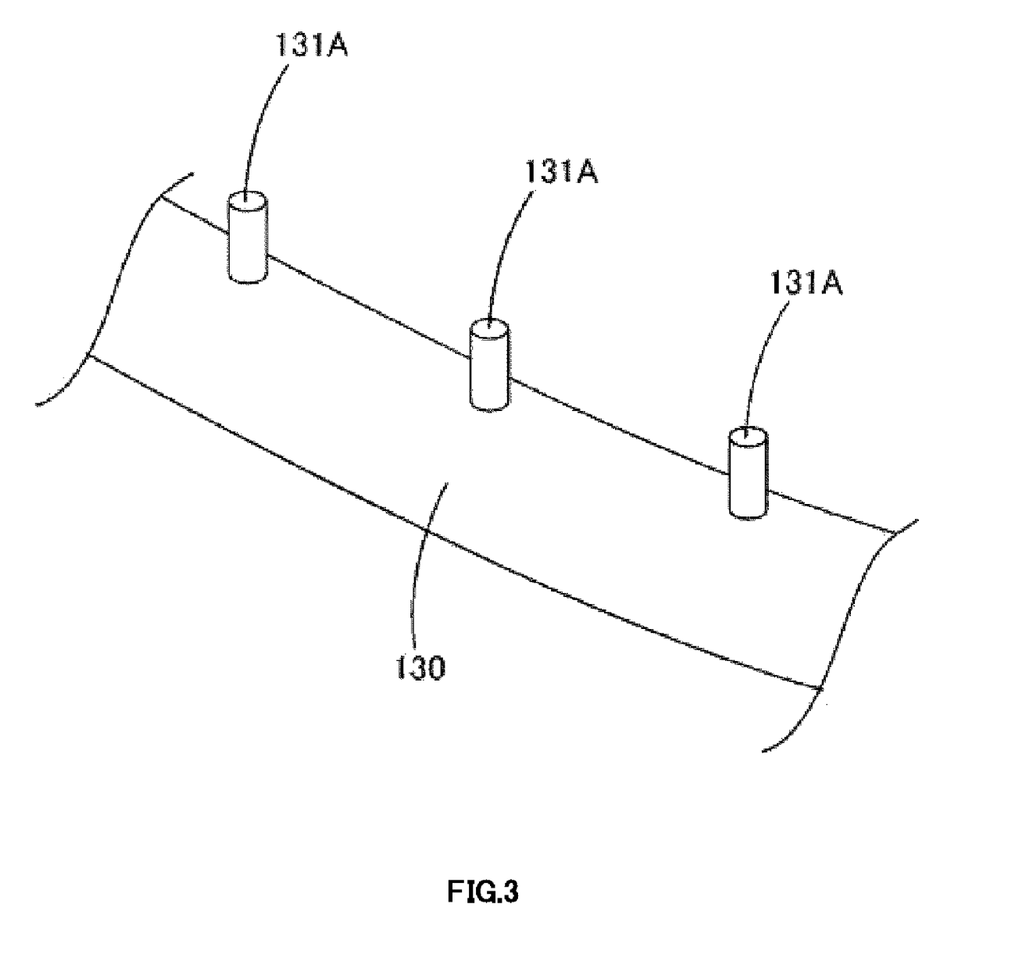
FIG. 3 is a perspective view illustrating essential constitution of air outlets arranged to an aeration tube in a barren solution treatment device.

That is, as to the aeration tube 130, for example, as shown in FIG. 3, when aeration is performed by around 10 to 20 short tube pipes 131A that are arranged at equal intervals as outlets 131, much higher aeration effect can be obtained.

EXAMPLES

Hereinafter, Examples of the present invention will be described, however, the present invention is not limited to the following Examples.

In the present Examples, in a hydrogen sulfide removal step provided as a preceding step of a detoxification step in a hydrometallurgy plant for a nickel oxide ore, a barren solution treatment was performed by using the above-described barren solution treatment device 100.

Table 4 shows results obtained by the measurement of the concentration of the dissolved hydrogen sulfide in a barren solution with or without aeration.

TABLE 4

|  | Concentration of hydrogen sulfide gas at an inlet (ppm) | Concentration of hydrogen sulfide gas at an outlet (ppm) |
| --- | --- | --- |
| Without aeration | 20 | 15 |
| With aeration | 20 | 5 |

As is apparent from the measurement results shown in Table 4, when aeration was not performed, the concentration of the dissolved hydrogen sulfide was 20 ppm at an inlet of an aeration tank, and 15 ppm at an outlet of an aeration tank, on the other hand when aeration was performed, the concentration of hydrogen sulfide at an outlet of an aeration tank was largely decreased to 5 ppm, and the dissolved hydrogen sulfide in a barren solution could effectively be decreased by aeration. As described above, it has been found that when a barren solution is treated by using a barren solution treatment device 100, the concentration of the dissolved hydrogen sulfide in the barren solution could effectively be decreased by the aeration.

REFERENCE SYMBOLS 100, 200 heavy-metal removal device; 110 reaction vessel; 120 stirring blade; 130 aeration tube; 131 air outlet; 131A short tube pipe; 151 baffle plate

The invention claimed is:

1. A treatment method for a barren solution containing hydrogen sulfide, wherein
in an aeration tank provided with a vertical-type cylindrical reaction vessel, stirring blades arranged in the reaction vessel, and an annular aeration tube having 10 to 20 air outlets and being arranged to a bottom part of the reaction vessel,
hydrogen sulfide is removed from the barren solution in a hydrogen sulfide removal step arranged as a preceding step of a detoxification step by partly adding a slurry after leaching obtained in a leaching step into a barren solution containing the hydrogen sulfide obtained as a process liquid after a sulfurization process in a hydrometallurgy plant for a nickel oxide ore and introducing gas for aeration into the reaction vessel from 10 to 20 air outlets of the aeration tube to perform aeration while stirring a barren solution containing hydrogen sulfide by rotation of the stirring blades.

2. The treatment method for a barren solution containing hydrogen sulfide according to claim 1, wherein
the barren solution obtained by removing the hydrogen sulfide is returned to a solid-liquid separation step to reuse as washing water.

3. The treatment method for a barren solution containing hydrogen sulfide according to claim 1, wherein
aeration is performed by the aeration tube formed in an annular shape having a diameter size of 70 to 90% of that of the reaction vessel.

4. The treatment method for a barren solution containing hydrogen sulfide according to claim 3, wherein
aeration is performed from the air outlets formed in a circular shape having a diameter of 10 to 20 mm.

5. The treatment method for a barren solution containing hydrogen sulfide according to claim 4, wherein
aeration is performed via short tube pipes arranged at equal intervals in the aeration tube as the air outlets.

6. The treatment method for a barren solution containing hydrogen sulfide according to claim 5, wherein
the gas for aeration is air.

7. A treatment device for a barren solution containing hydrogen sulfide, comprising:
an aeration tank provided with a vertical-type cylindrical reaction vessel, stirring blades arranged in the reaction vessel, and an annular aeration tube having 10 to 20 air outlets and being arranged to a bottom part of the reaction vessel, wherein in the aeration tank, hydrogen sulfide is removed from the barren solution in a hydrogen sulfide removal step arranged as a preceding step of a detoxification step by partly adding a slurry after leaching obtained in a leaching step into a barren solution containing the hydrogen sulfide obtained as a process liquid after a sulfurization process in a hydrometallurgy plant for a nickel oxide ore and introducing gas for aeration into the reaction vessel from 10 to 20 air outlets of the aeration tube to perform aeration, while adding a part of slurry after leaching obtained in a leaching step to a barren solution containing the hydrogen sulfide obtained as a process liquid after sulfurization process in a hydrometallurgy plant for a nickel oxide ore and stirring a barren solution containing hydrogen sulfide by rotation of the stirring blades, wherein aeration is performed by the aeration tube formed in an annular shape having a diameter size of 70 to 90% of that of the reaction vessel, aeration is performed from the air outlets formed in a circular shape having a diameter of 10 to 20 mm, and aeration is performed via short tube pipes arranged at equal intervals in the aeration tube as the air outlets.

8. The treatment device for a barren solution containing hydrogen sulfide according to claim 7, wherein the barren solution obtained by removing the hydrogen sulfide is returned to a solid-liquid separation step to reuse as washing water.

9. The treatment device for a barren solution containing hydrogen sulfide according to claim 7, wherein the gas for aeration is air.

\* \* \* \* \*